C. C. Gale.
Station Indicator.
Nº 52,704. Patented Feb. 20, 1866.

Witnesses
W. H. Burridge
J. W. McClelland

Inventor
C. C. Gale

# UNITED STATES PATENT OFFICE.

C. C. GALE, OF COLUMBUS, OHIO.

IMPROVEMENT IN RAILROAD-STATION INDICATORS.

Specification forming part of Letters Patent No. 52,704, dated February 20, 1866.

*To all whom it may concern:*

Be it known that I, C. C. GALE, of Columbus, in the county of Franklin and State of Ohio, have invented certain new and useful Improvements in Railroad-Station Indicators; and I do hereby declare that the following is a full and complete description of the construction and operation of the same, reference being had to the accompanying drawings, making a part of this specification, in which—

Figure 1:
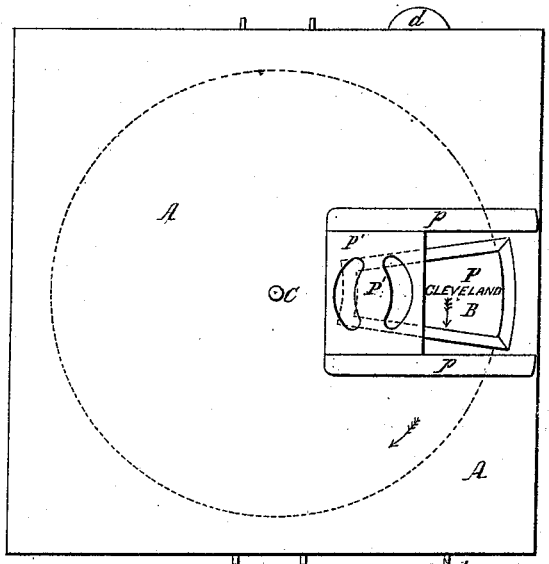
Figure 4:
Figure 2:
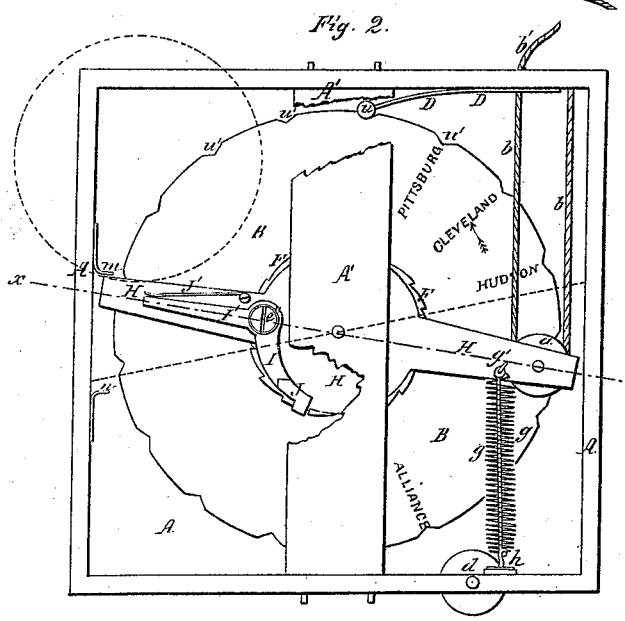
Figure 5:
Figure 6:
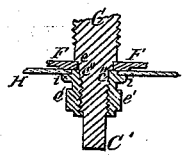
Figure 3:
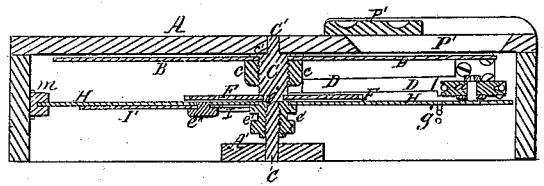

Figure 1 is a view of the front side of the indicator. Fig. 2 is a view of the side opposite from Fig. 1. Fig. 3 is a transverse section in the direction of the line $x\,x$ in Fig. 2. Figs. 4, 5, and 6 are sectional views that will be referred to in the description.

Like letters of reference refer to like parts in the several views.

My improvement relates to an arrangement of devices connected to a railroad-car, placed up at one or both ends, so as to be seen by all the passengers, whereby the name of the different stations on the road will be presented and at the same time a signal given, as hereinafter described.

In Figs. 1, 2, and 3, A represents a wooden case of a suitable form, inside of the front of which there is a disk, B, as indicated by the dotted line in Fig. 1, on a shaft, C. The journals C' of this shaft have their bearings in the center of the front of the case, and in a cross-piece, A', at the back part. The disk B is secured on the shaft by a screw-nut, $c$, as seen in Fig. 3, a thin washer, $c'$, being between the disk and case.

F is a ratchet-wheel placed on the shaft C, that fits against a shoulder, $e$, formed round on the shaft, shown in Figs. 3 and 6, Fig. 6 being an enlarged view. The ratchet-wheel is secured on the shaft by means of a screw-nut, $e'$, the inner portion of which forms a collar, as at $c''$, that is screwed down upon the wheel, a washer being formed round on the inner part of the wheel, as represented. On one side of the ratchet-wheel there is a lever, H, of the shape shown in Fig. 2. This lever is kept in place by fitting round the collar $c''$ of the nut, which is inserted through it onto the ratchet-wheel, and there is a collar, $i$, formed on the nut that extends over onto the lever. The lever thus connected to the shaft can move independent of it and of the ratchet-wheel. On one side of the lever is pivoted, by a screw, $e''$, a bent arm, I I', at one end of which is secured a pawl, J, that catches into the teeth of the ratchet-wheel, as shown in Figs. 2 and 5, Fig. 5 being a side view of a part of the ratchet-wheel, lever, arm, and pawl.

J' is a spring attached to the lever, that presses against one side of the end I' of the arm, that causes the pawl to work in the desired manner in the ratchet-wheel.

To the case, at one side, are secured stops $m\,n$, that one end of the lever H strikes against as it is operated. At the other end of the lever there is a pulley, $a'$, round which a rope or cord, $b$, passes. One end of this rope is attached to the case, and the other end passes out through a hole or opening, as represented in Fig. 2. There can be a friction roller or pulley, as shown at $d$, for one end of the rope to be attached to and pass around to ease its action.

$g\,g$ is a spiral spring, connected at one end to a hook, $g'$, on the lever, and at the other end to a hook, $h$, attached to the side of the case, whereby the lever is drawn back when the rope $b$ is released.

To one side of the case is attached a spring, D, on the end of which there is a head, $u$, that springs into notches $u'$ round on the periphery of the disk.

In the front of the case there is an opening, P, (shown and indicated by the dotted lines in Fig. 1,) over a part of which there is a slide, P', that is moved in guides $p$ on the case, and that likewise keep it in place.

The construction and arrangement of all the parts have now been described, which operate in the following manner: On one side of the disk, facing the front of the case, are printed distinctly the names of all the stations on a railroad between certain points, as shown in Fig. 4, which represents a section of the disk. If there is not room to print all the names round on the outer part of the disk, they can be printed round on the inner portion. For example, all the stations from Cleveland to Columbus can be printed round on the outside and from Columbus to Cincinnati on the inside, as represented, so that one indicator will answer for the entire length of the road from Cleveland to Cincinnati, it only being required to adjust the slide P' at Columbus so as to cover the outer part and uncover the inner part of the disk. The indicator is placed up in the front of each car, or at both ends, in a conspicuous place, so as to be seen by all the passengers. When the train leaves Cleveland, in going to Columbus or Cincinnati, the disk and slide are in the position shown in Fig. 1, and when it arrives at the first station, or Grafton, or before it arrives, by pulling the end $b'$ of the rope $b$ the lever H is moved in the direction of the arrow in Fig. 2 into the position indicated by the dotted line, one end of the lever coming against the stop $n$. This turns the disk in the direction of the arrow in Fig. 1 the distance from one of the notches $u'$ to the next, when the head $u$ of the spring D will spring into the notch, holding the disk steadily in place. This brings "Grafton" opposite the opening in the case, so as to be plainly seen by all the passengers, and there can be a bell or other signal connected to the indicator, if desired, to arrest the attention of the passengers. When the rope is released the spiral spring $g$ $g$ draws back the lever to its former position and the lever moves in this direction without turning the ratchet-wheel or shaft, for it turns round on the shaft, the pawl J, by means of the spring J', slipping round on a tooth of the ratchet-wheel and springs or catches into the next notch, so that when the rope is pulled the ratchet-wheel, with the shaft and disk, will turn or move with the lever, and one stroke of the lever moving between the stops $m$ $n$ turns the disk the distance between the notches, as before stated. There are the same number of teeth on the ratchet-wheel that there are notches round on the periphery of the disk, and the names of all the stations are printed opposite the notches in radial lines with the center of the disk, as represented. When the train leaves Grafton the disk is turned so as to bring "Crestline" in view, and so on of all the stations on the road, and when the train reaches Columbus, Delaware being the last station, the disk has been turned almost entirely round, when the slide P' can be moved along so as to cover the names on the outer part of the disk and uncover the inner part, on which is printed the stations from Columbus to Cincinnati, supposing London to be the first, Xenia the next, and so on. The disk is turned in the same manner for the inner names as those on the outside. On some roads the outer part of the disk is all that will be required to contain the names of the stations. In returning from Cincinnati to Cleveland the names of the stations will come in their regular order by turning the disk on round in the same direction.

The disk is also reversible, and the names of stations can be printed on the other side, as shown by "Cleveland," "Hudson," "Alliance," &c., in Fig. 2, when the disk can be readily turned so that the other side will face the front of the case, and be operated in the same manner for indicating the stations on a different or part of the same road.

With this indicator it is not required to announce the names of stations in the cars, which has so many disadvantages. It is always accompanied with slamming of doors, and in the hurry, noise, and confusion of passengers coming in and going out the name of the station is indistinctly heard, and if heard frequently forgotten, and the passengers are inquiring the name of the last station or of the one they are coming to. With the indicator which is so readily adjusted the name is presented so that it can be distinctly seen by all. When the train leaves one station the disk can be turned so as to bring the next one in view, that the passengers will know what place they are coming to, or it can be turned shortly before the train arrives at the station, as may be thought most desirable.

A bell, as noted by the circle A'' in Fig. 2, can be attached to the indicator, so that the lever H will strike against it in vibrating, giving a signal that will call the attention of the passengers to it.

The disk can be made of ground glass with black letters, so that a light can be placed behind it at night, rendering it transparent, and the same disk will answer equally well for daylight.

There can be one or more springs, $g$, for drawing back the lever.

What I claim as my improvement, and desire to secure by Letters Patent, is—

1. The arrangement of the reversible rotating disk B, spring-stop D, and spring $g$, in combination with the cord $b$, lever H, pawl J, and ratchet F, arranged and operating substantially as and for the purpose set forth.

2. The shaft C, nuts $c$ and $e'$, in combination with the ratchet F, lever H, arm I I,' spring J, and stops $m$ $n$, arranged and operating substantially as and for the purpose set forth.

C. C. GALE.

Witnesses:
  W. H. BURRIDGE,
  A. W. McCLELLAND.